(12) United States Patent
Nakamura et al.

(10) Patent No.: US 7,103,836 B1
(45) Date of Patent: Sep. 5, 2006

(54) METHOD AND SYSTEM FOR GENERATING MATERIALS FOR PRESENTATION ON A NON-FRAME CAPABLE WEB BROWSER

(75) Inventors: Lee Evan Nakamura, Morgan Hill, CA (US); Stewart Eugene Tate, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,999

(22) Filed: Jan. 10, 2000

Related U.S. Application Data

(62) Division of application No. 08/892,842, filed on Jul. 11, 1997, now Pat. No. 6,178,433.

(51) Int. Cl.
*G06F 15/00* (2006.01)

(52) U.S. Cl. .................... 715/526; 715/501.1
(58) Field of Classification Search ............... 707/513, 707/501.1, 517, 526; 715/513, 501.1, 517, 715/526, 500
See application file for complete search history.

(56) References Cited

U.S. PATENT DOCUMENTS

| | | | |
|---|---|---|---|
| 5,526,481 A * | 6/1996 | Parks et al. ............ 345/784 |
| 5,751,968 A * | 5/1998 | Cohen .................. 709/231 |
| 5,801,702 A * | 9/1998 | Dolan et al. ........... 345/854 |
| 5,802,299 A | 9/1998 | Logan et al. ........ 395/200.48 |
| 5,860,074 A * | 1/1999 | Rowe et al. ............ 715/526 |
| 5,870,559 A | 2/1999 | Leshem et al. ...... 395/200.54 |
| 5,894,554 A | 4/1999 | Lowery et al. ...... 395/200.33 |
| 5,895,476 A | 4/1999 | Orr et al. ............. 707/517 |
| 5,933,841 A * | 8/1999 | Schumacher et al. .. 715/501.1 |
| 5,945,989 A | 8/1999 | Freishtat et al. ........ 345/329 |
| 5,956,736 A * | 9/1999 | Hanson et al. ......... 715/513 |
| 5,959,867 A * | 9/1999 | Speciner et al. ....... 700/219 |
| 5,960,429 A * | 9/1999 | Peercy et al. ............ 707/5 |
| 5,960,448 A * | 9/1999 | Reichek et al. ........ 715/526 |
| 5,966,535 A * | 10/1999 | Benedikt et al. ....... 717/147 |
| 5,983,245 A * | 11/1999 | Newman et al. ....... 715/513 |
| 5,987,454 A * | 11/1999 | Hobbs .................. 707/4 |
| 5,999,911 A * | 12/1999 | Berg et al. ............. 705/9 |
| 6,009,429 A * | 12/1999 | Greer et al. .......... 707/10 |
| 6,021,426 A * | 2/2000 | Douglis et al. ........ 709/200 |
| 6,035,330 A * | 3/2000 | Astiz et al. ........... 709/218 |
| 6,061,696 A * | 5/2000 | Lee et al. ............ 707/513 |
| 6,061,700 A * | 5/2000 | Brobst et al. .......... 707/517 |
| 6,065,012 A * | 5/2000 | Balsara et al. ......... 345/839 |

(Continued)

OTHER PUBLICATIONS

Brown, Using Netscape 2, 1995, Que Corporation, pp. 8-11.*

(Continued)

*Primary Examiner*—Cong-Lac Huynh
(74) *Attorney, Agent, or Firm*—Sughrue Mion, PLLC

(57) ABSTRACT

A method and system are disclosed for managing Internet presentation materials in a single file format for ease of administration while presenting to an Internet requestor only those portions of the file requested, for maximum performance. Also disclosed is a system and method for presenting Internet materials using borderless presentation areas, where the background specification is decoupled from the presentation area specification. The invention also relates to a system and method for using a dynamic web page builder to generate and manage multiple instances of information to be simultaneously displayed in multiple presentation areas, in which one of the presentation areas contains table of contents information listing various selectable web pages stored in a single file. The table of contents information is continuously displayed on-screen when any of the items listed in the table of contents is selected for ease of navigation through a web site.

18 Claims, 7 Drawing Sheets

U.S. PATENT DOCUMENTS

| | | | |
|---|---|---|---|
| 6,072,598 A * | 6/2000 | Tso | 358/442 |
| 6,078,403 A * | 6/2000 | Palmer | 358/1.18 |
| 6,081,829 A * | 6/2000 | Sidana | 709/203 |
| 6,098,081 A * | 8/2000 | Heidorn et al. | 707/501.1 |
| 6,128,655 A * | 10/2000 | Fields et al. | 709/219 |
| 6,138,128 A * | 10/2000 | Perkowitz et al. | 707/501.1 |
| 6,178,433 B1 * | 1/2001 | Nakamura et al. | 707/513 |
| 6,185,588 B1 * | 2/2001 | Olson-Williams et al. | 707/515 |
| 6,199,071 B1 * | 3/2001 | Nielsen | 707/204 |
| 6,212,536 B1 * | 4/2001 | Klassen et al. | 715/513 |
| 6,253,228 B1 * | 6/2001 | Ferris et al. | 709/203 |
| 6,262,729 B1 * | 7/2001 | Marcos et al. | 345/335 |
| 6,275,833 B1 * | 8/2001 | Nakamura et al. | 707/513 |
| 6,353,839 B1 * | 3/2002 | King et al. | 707/513 |
| 6,369,819 B1 * | 4/2002 | Pitkow et al. | 345/440 |
| 6,405,221 B1 * | 6/2002 | Levine et al. | 715/501.1 |
| 6,424,718 B1 * | 7/2002 | Holloway | 380/277 |
| 6,429,880 B1 * | 8/2002 | Marcos et al. | 345/744 |
| 6,442,574 B1 * | 8/2002 | Schumacher et al. | 715/501.1 |
| 6,484,189 B1 * | 11/2002 | Gerlach et al. | 715/730 |
| 6,553,373 B1 * | 4/2003 | Boguraev et al. | 707/5 |
| 6,574,607 B1 * | 6/2003 | Carter et al. | 705/26 |
| 6,757,911 B1 * | 6/2004 | Shimoji et al. | 725/136 |
| 2003/0030634 A1 * | 2/2003 | Sang'udi et al. | 345/418 |

OTHER PUBLICATIONS

Brown, Using Netscape 2, 1995, Que Corporation, pp. 163, 675-679, 779.*

"Net.Data Programming Guide", IBM Corp. 1997, pp. i-64.

* cited by examiner

FIG. 1A
PRIOR ART
```
< HTML >   < HEAD >   < TITLE >   Web Page Title
< / TITLE >   < / HEAD >
< BODY >
< H1 >   This is a Heading   < / H1 >
< UL >   This is a list of bulleted items
< LI >   First bulleted item
< LI >   Second bulleted item
< LI >   Third bulleted item
< / UL >
< / BODY >
< / HTML >
```
FIG. 1B
PRIOR ART
Web Page Title
This is a Heading
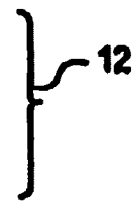
This is a list of bulleted items
● First bulleted item
● Second bulleted item
● Third bulleted item

FIG.4

IBM™
© IBM Corporation
Internet Yellow Pages — 58

50

Table of Contents
- Purpose — 52
- Overview — 53
- Hot New Technology
- Presentation Material
- Documentation
- Solution Demos
- Customer Installations
- Our Competition
- Other Web-related products from IBM
- Contacts Purpose — 56

To rapidly communicate material and information about the IBM Internet Yellow Page Solution.

This internet site is updated on a regular basis. It is our goal to provide a central location for marketing and technical information about IBM's Internet Yellow Page Solution.

Use : Click on a link in the Table of Contents above to read about that topic.

Visit the IBM Internet Yellow Pages Homepage.

[ IBM home page | Order | Search | Contact IBM | Help | ( C ) | ( TM ) ]

IBM ™
© IBM Corporation

Internet Yellow Pages — 58

50

Table of Contents
- Purpose
- Overview
- Hot New Technology
- Presentation Material
- Documentation
- Solution Demos
- Customer Installations
- Our Competition
- Other Web - related products from IBM
- Contacts Use : Click on a link in the Table of Contents Above to read about that topic.

Visit the IBM Internet Yellow Pages Homepage.

Overview — 66

IBM's Internet Yellow Page Solution is a collection of IBM software and hardware products. These " off-the-shelf " products were integrated with custom software to create a solution targeted at the needs of the telecommunication industry. This generic solution can be customized by IBM or customers to meet exact requirements.

Working closely with the telecommunications industry, IBM has developed an Electronic Yellow Page Solution which offers many advanced features over today's paper version. This rich set of function makes it second nature for consumers to " Let their fingers do the walking "

Using IBM's award-winning database, DB2, with DB2 Extenders and DB2 World Wide Web Connection, IBM is able to deliver the power and flexibility of a multimedia database to the Internet.

Maintaining and managing large - scale internet sites is a major undertaking. Many tasks must be faced on a daily basis. Handling thousands of files in hundreds of directories is one such task. IBM's Internet Yellow Pages uses DB2 to manage the data which most internet sites maintain in flat files. We provide administration and reporting tools to manage the data in your DB2 database.

[ IBM home page | Order | Search | Contact IBM | Help | (C) | (TM) ]

METHOD AND SYSTEM FOR GENERATING MATERIALS FOR PRESENTATION ON A NON-FRAME CAPABLE WEB BROWSER

This is a divisional of application Ser. No. 08/892,842 filed Jul. 11, 1997 now U.S. Pat. No. 6,178,433, the disclosure of which is incorporated herein by reference.

BACKGROUND OF THE INVENTION

1. Field of the Invention

The present invention relates to a system and method for presenting, over a network, materials contained in a single computer file.

2. Description of the Related Art

The Internet, as it is popularly known, has become an important and useful tool for accessing a wide variety of information. One component of the Internet is the World Wide Web (hereinafter, the web). In recent years the web has become an increasingly popular vehicle for providing information to virtually anyone with access to the Internet. Many sites (hereinafter, web sites) have been established to provide information in many different forms, such as text, graphics, video and audio formats over the web.

A typical web site includes system and application software programs installed on a web server that is connected to the Internet. By connecting the web server to the Internet, clients that are connected to the Internet can access the web site via the web server. Usually a client is located remotely from the web server, although the client and server can be at the same location. Also, a web server can be connected to a private intranet, as opposed to or in addition to the public Internet, in order to make a web site privately available to clients within an organization.

A client typically accesses the web site by using a web browser. The web browser is a software program which runs on the client and receives from the server information formatted in a known manner. A very popular format for information sent over the web from a server to a client, is the hypertext mark-up language (HTML). HTML is a tag based script format, in which tags surround the information to be presented. By tagging the information to be sent to a browser, the browser can interpret the tags and handle the presentation of the information sent from the server. It is left to the web browser, at the client, to determine the specific formatting of the information, based on the tags included in the HTML information sent from the server. For example, information to be displayed at a client might include header information followed by a list of other information. FIG. 1A shows a portion of HTML code with such a header and list. When the HTML information is received by a client and interpreted by a web browser, the information is displayed, as is shown in FIG. 1B, for example, in which a header 10 and list 12 are presented to a user at the client.

The HTML information sent by the server does not specify the particular size, font and placement of the header 10 and the list 12. Rather, the header and list information are surrounded by HTML tags which identify that information as a header and a list, respectively. It is the responsibility of the web browser at the client to determine how the information is presented.

Over the past several years, HTML-compliant web browsers have proliferated at a great rate. Accordingly, a large install base of HTML-compliant web browsers has been established worldwide.

HTML supports the use of links, which allow a web browser user to link from one source of information to another, easily and rapidly. A link provides a user with the means to navigate the web, and even navigate within a specific web site. The server, when sending HTML information to a web browser, would include a Uniform Resource Locator (URL) in information associated with the link. Typically, a link would be displayed to a user in a special format, such as being highlighted. The user could select that link, for example, by moving a pointing device such as a computer mouse to position a cursor over the link and selecting that link by pressing a button on the mouse. When a user selects a link, the web browser sends a request for the corresponding URL. The URL identifies a specific web resource, such as a specific web page at the web site. The server receives the request for the URL, determines the information to be sent to the client, accesses that information and then sends that new information to the client for presentation. The client receives the new presentation information sent by the server, which is typically HTML formatted information, and presents it to the user via the web browser. In this manner, the World Wide Web can be navigated by selecting links presented by the web browser, in which the links identify HTML web pages in a web site.

A web site generally includes more than one web page. Typically, each web page is defined in a single computer file, containing only the contents of that web page. In other words, the web page is defined in a flat HTML file. When the server receives a message containing a request for a URL, that URL generally identifies the file for the requested web page. The server, in response to the message, retrieves the file for the requested web page and transmits the contents of the retrieved file to the client. In this manner, the web pages are maintained separately for ease of access. However, using a separate file for each web page introduces problems with maintaining multiple files. As a web site becomes larger and more complex, the number of web pages generally would increase. Accordingly, the number of HTML flat files becomes larger. With the increase in the number of HTML flat files comes added complexity for the document creator or webmaster to manage those files.

A solution to the problem of managing a large number of HTML flat files is to include a plurality of a web site's pages in a single file. Here, each time the client requests one of the plurality of pages, the server would download to the client the entire single file containing the requested page as well as the other pages stored in the same file but not requested. Accordingly, when a client requests any of the web pages in the site, the entire file containing the requested page would be sent to the requesting client, including some non-requested pages. For a very small web site, a single file which contains all the web pages of the site could be used. Although, while storing all the pages in a single site may be feasible, as the size of the web site grows, the size of the single file would grow. Transmitting a large file containing all the web pages, or even a plurality of web pages, would likely cause the performance of the web site to be degraded, manifesting itself in long response times at the client, and increased network traffic.

Accordingly, in the conventional environment described above, an HTML document creator, or webmaster, is faced with either the system administration headache of managing and maintaining multiple, flat HTML files, or subjecting users to downloading one, potentially very large document for each request.

Also, a limitation of earlier versions of HTML-compliant web browsers is that only a single web page could be presented to a user at any particular time. Although the web provides tremendous capabilities for presenting a wide variety and great depth of information, this limitation of existing web browsers to display only a single page of information at a time limits the usefulness, and the power of the web.

A solution to this problem has been to include in web browsers a feature known as frames, as used in some of the NAVIGATOR products manufactured by Netscape Communications Corp. A frame-capable web browser, such as NAVIGATOR 3.0, allows a client to display, via the web browser, more than one frame at a time. This feature allows a user to display one set of information in one frame, while displaying another set of information in another frame, so that both frames are displayed by the web browser at the same time. FIG. 2 shows an example of a display generated by a frame-capable web browser. The display shown in FIG. 2 includes four frames of information displayed at the same time. As depicted in FIG. 2, a table of contents frame 20, shown on the left-hand side of the display, would list items related to the table of contents of a document. A header frame 22, shown in the upper portion the display, would contain information identifying the information shown in a main frame 24, depicted in the middle of the display of FIG. 2. The main frame 24 would contain detailed information related to the item selected in the table of contents frame 20. A footer frame 26 may also be included to present information at the bottom of the display, such as footnotes, or a number of links, for example.

In this frame-based environment if a user selects one of the items contained in the table of contents frame, a request for a URL is sent to the web server to direct it to send new information to be displayed in the main frame relating to that specific URL. For example, if the user selects an item in the table of contents frame, the web browser, in response, sends to the web server a request for a URL unique to that selected item. The web server receives the request for the URL which might identify a separate computer file on the server. The information in that file is transmitted to the web browser and the web browser displays the received information in the main frame.

In order to manage and identify the frames in which the information is to be displayed, the server requires that specific frames be identified in the HTML structure of the files at the server. For example, Table 1 shows an example of HTML source code necessary for creating the frames shown in FIG. 2. For example, frame tags are required in the HTML source code to identify a frame. Those frame tags include a frame source name (SRC) and attributes about the frame such as the location for display by the web browser (e.g., row and column sizes). Here for example, the table of contents frame is located in a separate file named TOC.HTM. The frame tag identifies the size of the frame and location of the frame. Similarly, the frame tags for the header, main and footer frames identify those frames as well as the relative positions of those frames for display by the web browser. Upon receiving these special frame tags, the frame-capable web browser decodes those frame tags. The web browser then displays the information relating to each frame in the corresponding frame. That information is displayed in areas at the location and relative size specified by the frame tags.

TABLE 1

HTML Source Code for A Frame Based Web Browser

<HTML>
<HEAD>
<TITLE>Title of Web Page With Frames</TITLE></HEAD>

TABLE 1-continued

HTML Source Code for A Frame Based Web Browser

<FRAMESET ROWS="20%,60%,20%">
  <FRAME SRC="header.htm">
  <FRAMESET COLS="20%,80%">
    <FRAME SRC="toc.htm">
    <FRAME SRC="main.htm">
  <FRAMESET>
  <FRAME SRC="footer.htm">
</FRAMESET>
<HTML>
File: HEADER.HTM
<HTML><BODY>
Header Frame
</BODY></HTML>
File: TOC.HTM
<HTML><BODY>
Table of Contents Frame
</BODY></HTML>
File: MAIN.HTM
<HTML><BODY>
Main Frame
</BODY></HTML>
File: FOOTER.HTM
<HTML><BODY>
Footer Frame
</BODY></HTML>

Although use of frames provides another dimension of functionality for display of web-based information, web sites that use frames require web browsers to support the frame feature, in order to have information presented in the frames. While displaying information according to a frame paradigm can be useful in displaying web-based information, the size of the install base of non-frame-capable web browsers limits the use of frames. That is, in order to use frames, a frame-capable web browser must be installed on the client. However, because of the large number of installed web browsers which are not frame-capable, use of frames on web sites is often avoided, or else HTML code is included to generate both frame-based and non-frame-based web pages for transmission to frame capable and non-frame-capable web browsers. Creating two sets of data, one for frame-capable browsers and another for non-frame capable browsers, creates difficulties in managing and maintaining the redundant information.

Another problem with the use of presenting information in frames, is that a single, unified background image cannot be presented by a web-browser that presents frames of information.

SUMMARY OF THE INVENTION

The present invention is directed to solving the above problems. That is, the present invention is directed to presenting information over the World Wide Web in a manner such that information from different files or from the same file can be displayed at the same time in a related manner, but without requiring a frame-capable web browser.

An object of the present invention is to provide a system and method for managing internet presentation materials in a single file format for ease of administration while presenting to an internet requestor only those portions of the file requested, for maximum performance.

Another object is to provide a system and method for presenting internet information using borderless presentation areas, where the background specification is decoupled from the presentation area specification.

Yet another object is to provide a system and method for using a dynamic web page builder to generate and manage multiple simultaneous presentation areas, including where one presentation area includes table of contents information covering other content on a web site and where the table of contents information is maintained continuously on-screen for ease of navigation through the web site.

Still another object of the invention is to provide a method and system for generating presentation materials for transport over a network to a browser, in which the browser is not capable of handling frames.

Yet another object of the invention is to provide a web macro, which is computer-readable and embodied on a tangible medium, and which directs generation of pages of presentation materials, wherein only a single instance of information is maintained, yet that information is used in generating a plurality of the pages of presentation material.

BRIEF DESCRIPTION OF THE DRAWINGS

The above objects and advantages of the present invention will become more apparent by describing in detail a preferred embodiment thereof with reference to the attached drawings in which:

FIGS. 1A and B respectively depict HTML source code for a web page and a display generated by a web browser based on that source code, as is known in the prior art;

FIG. 4 shows presentation of materials on a web browser according to the invention;

FIG. 6 shows presentation of other materials on a web browser according to the invention;

FIG. 7 shows a display of materials with pseudo-frames, according to the invention.

DETAILED DESCRIPTION OF THE INVENTION

A preferred embodiment of a method, system and article of manufacture for managing internet presentation materials in a single file format according to the present invention is described below in detail with reference to the accompanying drawings.

Figure 2:
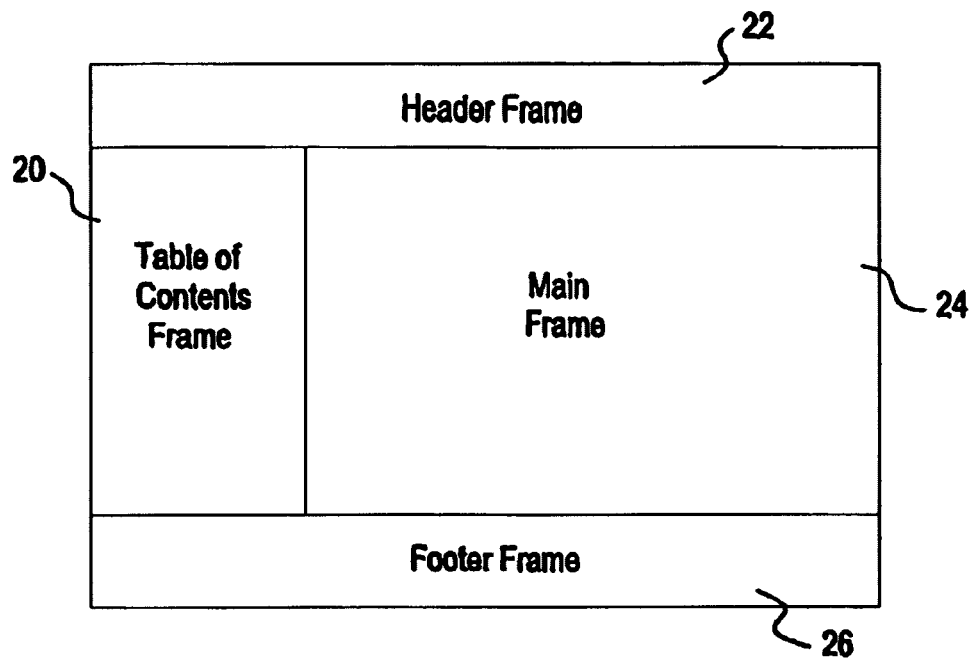
FIG. 2 depicts frames produced by a frame-capable web browser, as is known in the prior art.
Figure 3:
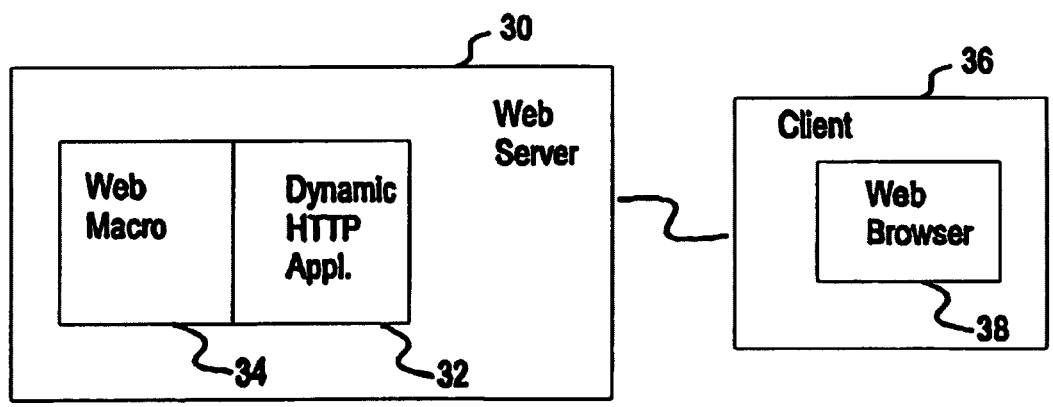
FIG. 3 is a block diagram of a client/server system for transmitting presentation materials from a web-based server to a client according to the invention.

The present invention is directed to a method, system and article of manufacture for managing internet presentation materials in a single file format. The invention takes advantage of properties of a dynamic HTTP application software 32 program which runs on a web server 30, as shown in FIG. 3. An example of a preferred dynamic HTTP application is NET.DATA manufactured by IBM Corp., although, other programs capable of dynamically creating internet/intranet information can be used. The dynamic HTTP application 32 allows information on a web page to be created or changed dynamically, while the application program is running, as opposed to maintaining merely static information which can be changed only by a system administrator, or similarly authorized person. The dynamic HTTP application 32 operates according to a web macro 34.

The web macro 34 includes programming statements and is an embodiment of the single file format of the present invention. The web macro can be stored on a tangible, computer-readable medium, such as a computer-readable disk or tape. However, the web macro 34 is not limited to those media and may be recorded on any media which can be read so that the programming statements are supplied to the dynamic HTTP application 32. Table 2 shows an example of a portion of a web macro according to the present invention. The web macro can be recorded in a single file and includes two sections. The first section of the web macro is a definition section, typically beginning with a statement of the form % define{variable_name={variable_value %}%}.

TABLE 2

Web Macro with a Plurality of HTML Sections

```
%define{
   header = {
      <center>IBM Internet Yellow Pages</center>
   % }
   contents = {
      <b>Table of Contents</b>
      <ul>
      <li><a href=" . . . ">Purpose</a>
      <li><a href=" . . . ">Overview</a>
      <li>Hot <a href=" . . . ">New Technology</a>
         .
         .
         .
      </ul>
   % }
   purpose = {
      <b><i>Purpose</i></b>
      <blockquote>
         To rapidly communicate material and . . .
         <p>This internet site is updated . . .
      </blockquote>
   % }
   overview = {
      <b><i>Overview</i></b>
      <blockquote>
         IBM's Internet Yellow Page Solution is a collection of IBM
         software and hardware products . . .
         <p>Using IBM's award-winning database, DB2, . . .
      </blockquote>
   % }
      .
      .
      .
   footer = {
      <a href=" . . . ">IBM home page</a> |
      <a href=" . . . ">Order</a> |
      <a href=" . . . " >Search</a> |
         .
         .
         .
      </BODY></HTML>
   % }
% }
   .
   .
   .
%HTML(purpose){
   $(header)
   $(contents)
   $(purpose)
   $(footer)
% }
%HTML(overview){
   $(header)
   $(contents)
   $(overview)
   $(footer)
% }
   .
   .
   .
% }
```

Variables are defined within the % define section of the web macro. For example, five variables are defined in the % define section of the web macro shown in Table 2. The first variable defined in this example is the variable "header," followed by the variable "contents." Here, the value of the "contents" variable is text describing a table of contents for a series of charts used in a presentation. This example uses charts as the content of the web pages, merely to illustrate that the value of a variable can be essentially any type of information. Here, the Table of Contents includes at least three items, namely, Purpose, Overview and Hot New Technology. The third variable is named "purpose." The value of the variable "purpose" is text describing the purpose of the subject matter of the charts. As shown in Table 2 the value of the variable "purpose" is simply some paragraphs of text information. The fourth variable shown in this web macro is named "overview." Here too, the value of the variable "overview" is text information. The text in the "overview" variable is to be presented on the web page as part of the charts for presentation at the client. The fifth variable in the web macro is named "footer" and includes links for a menu bar displayed at the bottom of the page.

The second section of the web macro is the portion of the macro for generating HTML. In the example shown in Table 2 the statement % HTML{ ... %}encompasses the HTML statements which are generated by the dynamic HTTP application. In the example shown in Table 2, the HTML generated is based on substitution of the contents of four variables for those variables. See % HTML(purpose) { ... % } for example. The first variable is "header" which provides header information for a header to be included in the web page to be generated. The second variable is "contents." Here, the value of the variable "contents," which is discussed above, is inserted in the web page. Accordingly the variable "contents" in this example provides the Table of Contents to be displayed on the left-hand column of the web page, as shown in FIG. 4. In a frame-based system, which would require a frame-capable browser, the Table of Contents would correspond to a separate frame for displaying table of contents information. However, as seen here, separate frames are not required since the information can be displayed in a single web page generated by the dynamic HTTP application 32. The third variable in the HTML section is the variable "purpose". Here, the value of the variable "purpose" is inserted into the web page by the dynamic HTTP application, when the macro is interpreted. As shown in FIG. 4, the paragraphs defined as the values of the variable "purpose" are included in the HTML for the web page sent to the client 36. Accordingly, the web browser 38 displays those paragraphs in an area that would correspond to a main frame in a frame-based system The last variable in the HTML section for this example is the variable "footer". Here, a footer is produced by generating corresponding HTML tags for the web page by substituting the contents of the variable "footer", resulting in a footer being displayed on the web page. The footer in FIG. 4 is a menu bar 59 shown at the bottom of the display.

Multiple HTML-input sections can be included in the web macro. In the example shown in Table 2, two HTML sections are defined. The first HTML section defines the case where a user has selected the "Purpose" item listed in the Table of Contents presented by the web browser. The result is an HTML web page generated which contains a header, a table of contents, a Purpose section presented in the middle portion of the display, and a footer, as shown in FIG. 4.

The web page shown in FIG. 4 includes a first area 50 (Table of Contents) and a second area 56 (Purpose), which are associated by the list of items in the first area.

Figure 5:
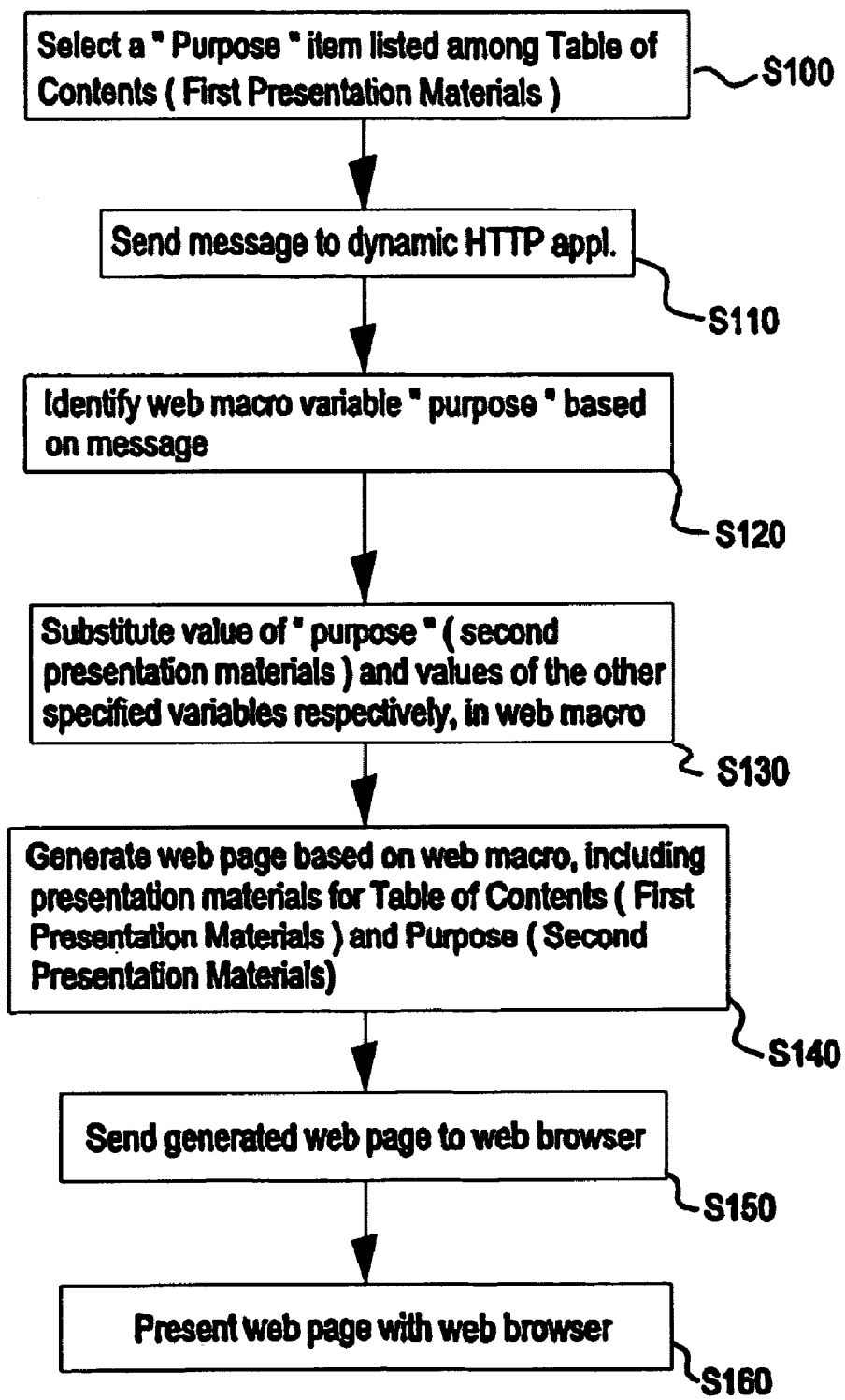
FIG. 5 is a flowchart for describing a process of generating the presentation materials shown in FIG. 4.

Operation of the web macro according to the invention is described below with reference to the flowchart shown in FIG. 5. When a requestor selects the Purpose item 52 listed in the table of contents area 50 of the display shown in FIG. 4, the first HTML section of the web macro shown in Table 2 is interpreted, thereby generating HTML for a web page. More specifically, when the Purpose item 52 is selected by the requester (step S100), the web browser 38 generates a message including a request for a URL, which is sent to the web server 30 to link to the Purpose page. The web server 30 passes the request for the URL to the dynamic HTTP application 32 (step S110). The dynamic HTTP application 32 invokes the web macro 34 and supplies the variable "purpose" to the web macro's HTML sections (step S120). In this case, the first HTML section corresponds to "purpose," and accordingly that portion of the HTML part of the web macro is interpreted by the dynamic HTTP application 32. When the first HTML section is interpreted, the value of the variable "purpose" is substituted for the variable "purpose", along with values of other specified variables being substituted (step S130). The result is the web page shown in FIG. 4 being generated (step S140). The web page shown in FIG. 4 includes the header 58, the table of contents 50, and the footer 59, and it also includes in a middle portion, or main area 56, the purpose information that is defined for the "purpose" variable. Here, the value of the "purpose" variable is shown in the middle portion of the display and includes the word "Purpose" and two paragraphs of text. In this manner when a requestor selects an item from the first area 50, corresponding to the Table of Contents in this example, a request is sent to the web server 30 and ultimately to the dynamic HTTP application 32 to generate another web page which includes not only the information of the first area 50 (e.g., the table of contents information) but also second information corresponding to information displayed in the main area 56, here, the Purpose information. Once the HTML web page is generated and transmitted from the web server 30 to the client 36 (step S150), the web browser 38 displays the HTML page as shown in FIG. 4 (step S160). Other information such as header 58 and footer 59 information can also be included in the generated web page, for presentation at the client by the web browser.

Only portions of the web macro 34 requested by the user, are interpreted. Accordingly, a plurality of web page definitions can be stored and managed in a single file, i.e., the web macro, yet only those portions requested by a user are included in the web page generated from the web macro 34.

As another example, when the user selects the Overview item 53 in the Table of Contents 50, a URL is generated which identifies the "overview" variable. The corresponding request for the URL is transmitted to the web server 30. The web server 30 passes the request for the URL to the dynamic HTTP application which generates a new web page by interpreting the second HTML section of the web macro 34. Here the second HTML section, which is selected when the "overview" variable is identified, is interpreted since the URL identifies the variable "overview." As described above, a web page is then generated having the same header 58, footer 59 and Table of Contents information 50 as before, and also having an Overview portion 66, which is presented in a main area of the web browser display, as shown in FIG. 6. Here, the contents of the "overview" variable are substituted in the HTML generated for the requested web page. Similarly, the values of the other variables specified for the selected HTML section, are substituted when generating the requested web page. That requested web page, generated by the dynamic HTTP application, is passed to the server which transmits it to the client. The client 36 receives the generated HTML for the web same header 58, footer 59 and table of contents 50 presented in the previous page, but now also presenting new information shown in the main area, namely, the Overview information 66.

In the manner described above, information is defined only once, in the variable definitions, and can be maintained in a single file, yet multiple web pages can be generated from that single instance of the information. Accordingly, the information which is used in multiple web pages can be maintained in only a single location, thereby eliminating the need to maintain a separate copy of that information for each web page in which it is used. Maintaining all the information for the web site in a single computer file simplifies the webmaster's task of having to keep track of all the separate files which comprise a web page, or web site. Moreover, by only providing those portions of the web page requested by a user, maintaining all the information for the web page or web site does not impact performance, since only the requested portions are transmitted. Furthermore, the single instance of the information stored in the web macro can be handled and presented with a non-frame capable web browser. Such a non-frame capable web browser can present the information, maintained in a single instance, because the client receives a complete web page in response to each selection of an item in the first area, rather than receiving only a frame of information. Accordingly, a web page generated according to the present invention and presented at the client using a non-frame capable web browser, gives the appearance of consisting of logical frames, without requiring the web browser to be capable of supporting frame tags. This appearance is a result of the information being dynamically updated at various locations of the display, yet the web browser does not need to support frame tags and must only be able to receive and present a single page of web information. Accordingly, the present invention provides the capability of giving the appearance of presenting information in frames, but does not require a frame-capable web browser to be installed on the client in order to present that information.

In another embodiment of the present invention the web macro 34 can include only a single HTML section, yet support generation of web pages that give the appearance of including a plurality of frames. Table 3 shows an example of a web macro 34 for the same web pages shown in FIGS. 4 and 6, but employs only a single HTML section. Here, the % define section of the web macro is the same as in the embodiment discussed above, in which the "header", "contents" and "footer" variables are defined the same as in the previously described embodiment. However, the variables for the main area of display are included in an "if" structure. Here, when the dynamic HTTP application 32 receives a request for a URL from the web browser 38 which indicates a particular item selected from the first area (e.g., the Table of Contents area), the variable in the "if" structure, corresponding to the received URL request, is evaluated to generate the HTML information to be transmitted to the client 36. For example, if a requester selects the Overview section, a request for the URL for "overview" is sent to the web server 30 which pass it to the dynamic HTTP application. The dynamic HTTP application executes the HTML section and evaluates the "if" statement. Accordingly, the value of the variable "overview" is substituted for the $(overview) statement in the HTML section of the web macro, since the argument passed to the HTML section is "overview." In this manner the same HTML section can be used for all the items listed in the Table of Contents area of the web page.

TABLE 3

Web Macro with Single HTML Section

```
%define{
   header = {
      <center>IBM Internet Yellow Pages</center>
   % }
   contents = {
      <b>Table of Contents</b>
         <ul>
         <li><a href=" . . . ">Purpose</a>
         <li><a href=" . . . ">Overview</a>
         <li>Hot <a href=" . . . ">New Technology</a>
                  .
                  .
                  .
         </ul>
   % }
   purpose = {
      <b><i>Purpose</i></b>
      <blockquote>
         To rapidly communicate material and . . .
         <p>This internet site is updated . . .
      </blockquote>
   % }
   overview = {
      <b><i>Overview</i></b>
      <blockquote>
         IBM's Internet Yellow Page Solution is a collection of IBM
         software and hardware products . . .
         <p>Using IBM's award-winning database, DB2, . . .
      </blockquote>
   % }
                  .
                  .
                  .
   footer = {
      <a>IBM home page</a> |
      <a>Order</a> |
                  .
                  .
                  .
      </BODY></HTML>
                  .
                  .
                  .
   % }
%HTML_INPUT{
   $(header)
   $(contents)
   %if ( "$(arg)" == "purpose" )
      $(purpose)
   %elseif ( "$(arg)" == "overview" )
      $(overview)
                  .
                  .
                  .
   $(footer)
% }
```

Figure 7:
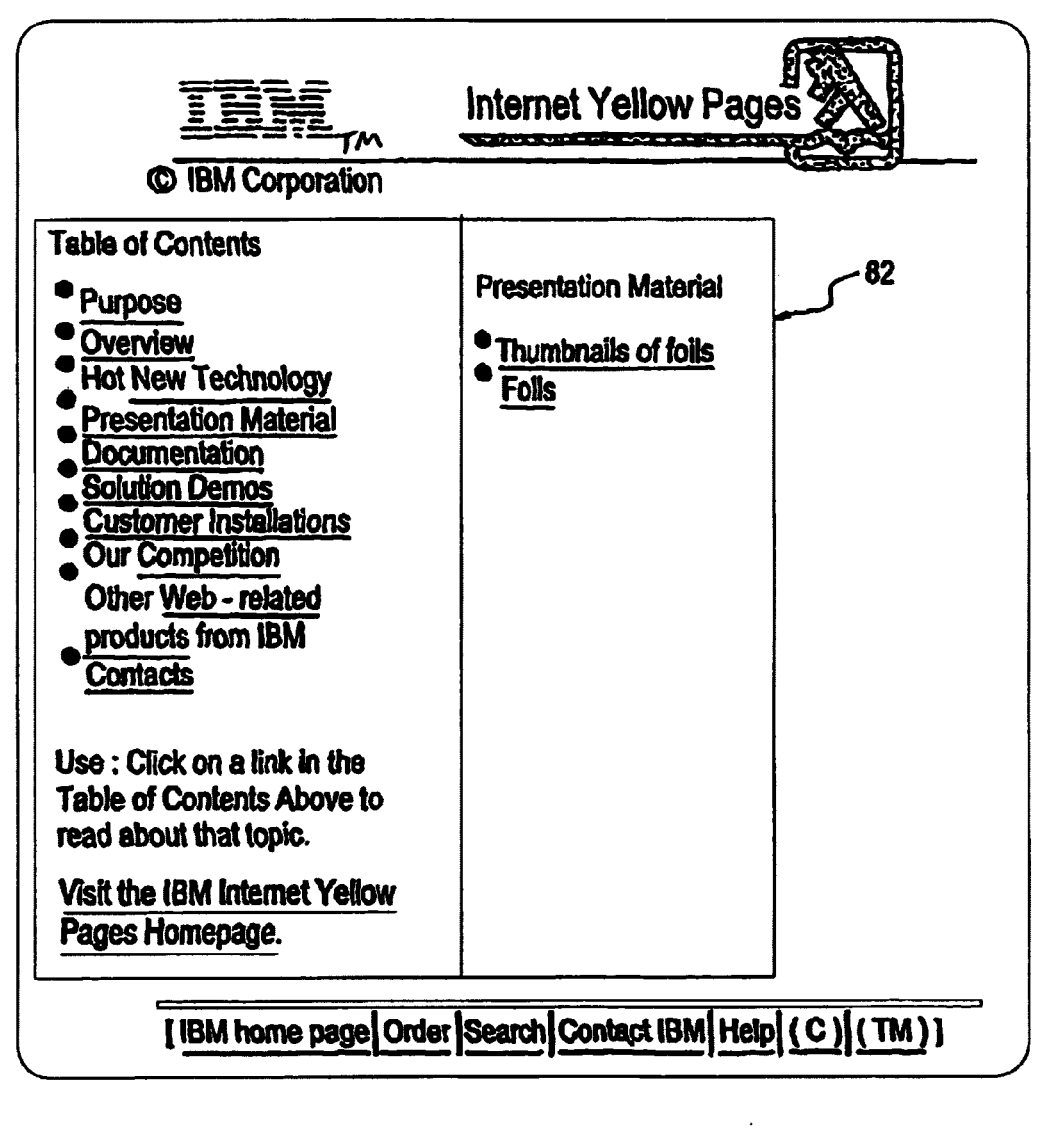

In still another embodiment the web browser 38 is controlled by the web macro and web server to make the presentation of the information in the web macro 34 appear even more like frames, by including borders around the various logical frames, or presentation areas, of the web page, as shown in FIG. 7. More specifically, the HTML generated based on the web macro 34 causes the web browser to create a pseudo-border 82 around each of the presentation areas defined in the HTML section, as shown in FIG. 7. Here, a border is drawn around one or more of the presentation areas of the web page. The border is defined by the HTML generated to produce the web page. The web page is constructed by the dynamic HTTP application 32 so that the client continues to receive a full web page upon each request. However, in this embodiment borders are also produced to more clearly delineate the boundaries between the different presentation areas displayed at the client.

Figure 8:
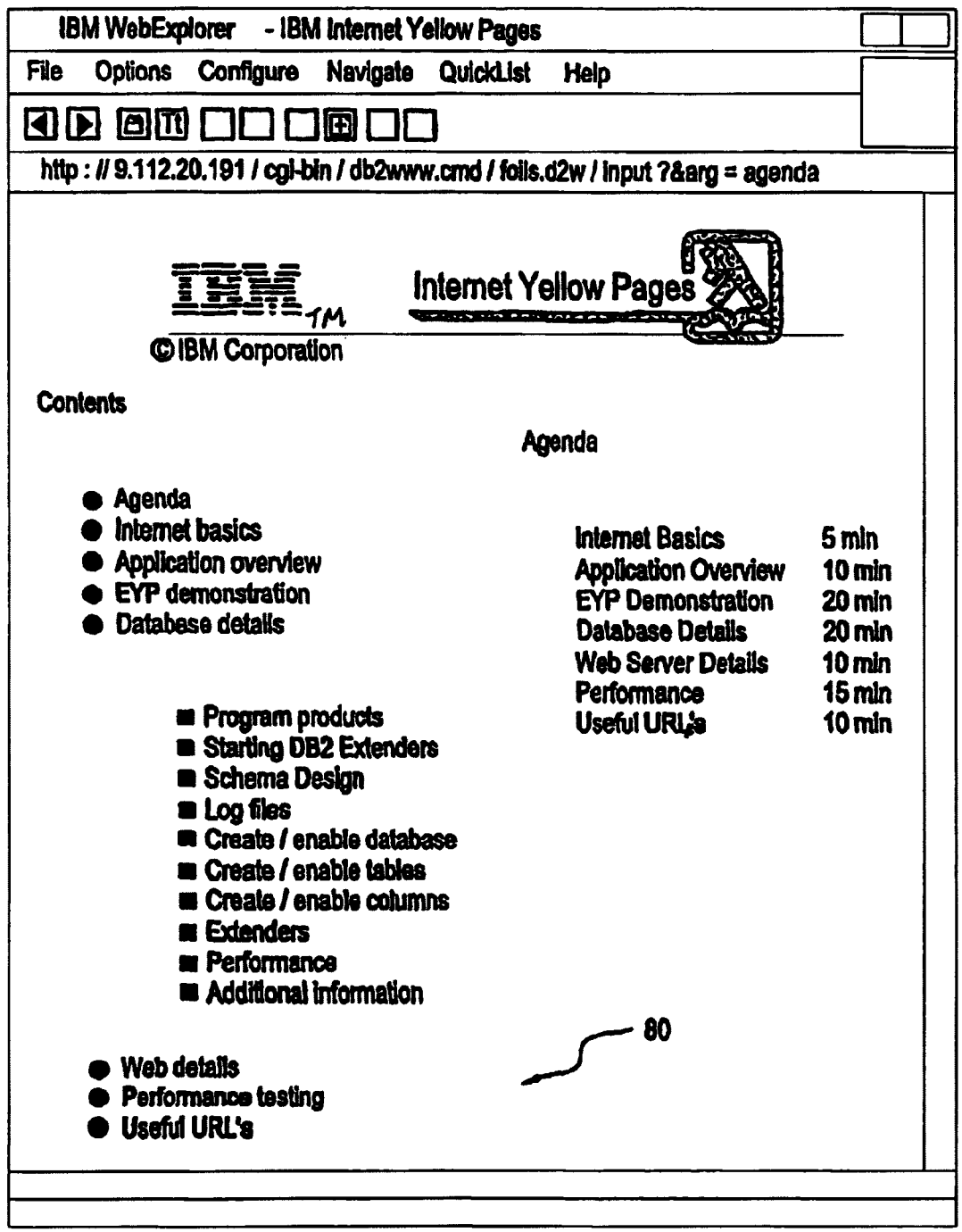
FIG. 8 shows a plurality of presentation areas with a uniform background across all the presentation areas.

In yet another embodiment, the web macro 34 allows a web page to be generated which include a plurality of presentation areas and a background. Here, the background is decoupled from the plurality of presentation areas so that the background appears uniform across the presentation areas. For example, if the web macro includes a background tag for pages that are generated, upon receiving a request for the Purpose information discussed above, the dynamic HTTP application would generate a web page having header, footer, Table of Contents and Purpose presentation areas, along with a single uniform background defined in the web macro. FIG. 8 shows an example of a web page created in which the macro, in the HTML section for the requested information, defines a background 80 to be displayed. As can be seen in FIG. 8, the background 80 appears uniform across all the presentation areas. This capability would not be possible were the web page implemented with frame tags.

In still yet another embodiment, the variables are defined in one or more different files. By use of "include" statements, the values of the variables can be retrieved from the files in which they are stored and included in the single web macro containing the HTML sections when that macro is invoked.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention. For example, the present invention is described in terms of generating HTML as a language for producing the web page. However, the present invention is not limited to only the HTML language. Rather, the present invention includes any other language capable of being dynamically generated to express materials to be presented at a client. Also, the present invention is not limited to an HTTP application, but includes any other dynamic application capable of dynamically substituting values of variables to create presentation materials.

What is claimed is:

1. A method for managing internet presentation materials in a single file format for ease of administration while presenting to a requestor only those portions of a file requested, comprising:
    defining, in a first portion of the file, a first variable for first information and a second variable for second information, where said first information and said second information are in the file;
    defining, in a second portion of the file, first and second presentation layouts, wherein said first presentation layout includes said first variable and said second presentation layout includes said second variable; and
    dynamically generating a page of presentation material in response to a request for said first information by using the first variable to extract said first information from the file and placing the first information in the page of presentation material, wherein the page is generated based on the first presentation layout and includes said first information and does not contain said second information.

2. The method according to claim 1, wherein said page is a World Wide Web page for display on a web browser and wherein the browser is the web browser.

3. The method according to claim 2, wherein said web browser does not support a hypertext markup language (HTML) frame tag.

4. The method according to claim 1, where said request includes a uniform resource locator (URL).

5. The method according to claim 1, wherein the browser requests a page based on a user selection, and wherein the request is transmitted to a server that dynamically generates the page based only on the single file and the request.

6. The method according to claim 1, further comprising loading the dynamically generated page into a browser for display.

7. The method according to claim 1, wherein the first presentation comprises the first variable and instructions for dynamically generating the page.

8. A system for managing internet presentation materials in a single file format for ease of administration while presenting to a requestor only those portions of a file requested, comprising:
    a server for communicating with a client;
    a dynamic presentation page generating unit, coupled with said server;
    a macro program, coupled with said dynamic presentation page generation unit, having first and second presentation material stored therein,
    wherein said dynamic presentation page generating unit, in response to a message received by said server requesting said first presentation material, dynamically generates a page of presentation material based on the macro program by using the first variable to extract said first information from the file and placing the first information in the page of presentation material, the generated page including said first presentation material and not including said second presentation material.

9. The system according to claim 8, wherein said dynamic presentation page unit generates said page of presentation material in the form of hypertext markup language (HTML) for presentation on a non-frame-capable web browser.

10. The system according to claim 8, wherein the dynamically generated page of the presentation material is transmitted to the client from the server and is displayed at the client by a browser.

11. The system according to claim 10, wherein the page is created at the server based on instructions for dynamically generating the page stored in the second portion of the file.

12. A computer-readable medium encoded with a computer program, comprising:
    a definition area having presentation information stored therein, wherein the presentation information defines a presentation layout of the presentation information when displayed on a display unit;
    a presentation page area having a plurality of presentation definition sections defined therein, wherein in response to a request from a client said presentation information of said definition area is combined with a selected one of the presentation definition sections of said presentation page area to dynamically generate a presentation page for display at the client by using a first variable to extract first information from a file including the definition area and the presentation page area and placing the first information in the presentation page.

13. The computer-readable medium according to claim 12, wherein said presentation information is stored as a value of a variable.

14. The computer-readable medium according to claim 12, wherein a background is stored in the definition area and is combined with the selected presentation definition section for uniform display across the presentation areas displayed on a web browser.

15. The computer-readable medium according to claim 12, wherein the display unit is a web browser.

16. The computer-readable medium according to claim 12, wherein the computer-readable program is a web macro.

17. The computer-readable medium encoded with the computer program according to claim 12, wherein the dynamically generated page of the presentation material is transmitted to the client and are loaded for display by the display unit at the client.

18. The computer-readable medium encoded with the computer program according to claim 12, wherein the page is created at the server based on instructions for dynamically generating the page stored in the second portion of the file.

* * * * *